(12) United States Patent
Chenoweth et al.

(10) Patent No.: US 7,473,744 B2
(45) Date of Patent: Jan. 6, 2009

(54) PROCESS FOR THE PRODUCTION OF POLYMERS USING A LOOP REACTOR

(75) Inventors: Harold Chenoweth, Houston, TX (US); Jeffrey Tilley, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 378 days.

(21) Appl. No.: 11/265,450

(22) Filed: Nov. 2, 2005

(65) Prior Publication Data

US 2006/0126777 A1    Jun. 15, 2006

Related U.S. Application Data

(60) Provisional application No. 60/625,308, filed on Nov. 4, 2004.

(51) Int. Cl.
*C08F 2/00* (2006.01)
*B01J 19/24* (2006.01)

(52) U.S. Cl. .................... 526/64; 526/352; 526/918; 422/132

(58) Field of Classification Search .............. 526/64, 526/918; 422/132
See application file for complete search history.

(56) References Cited

U.S. PATENT DOCUMENTS

| 3,293,000 | A | | 12/1966 | Marwil .................... 23/285 |
| 4,325,837 | A | * | 4/1982 | Capshew et al. .......... 502/108 |
| 4,613,484 | A | * | 9/1986 | Ayres et al. .............. 422/132 |
| 6,303,825 | B1 | | 10/2001 | Gerlich et al. ............ 568/385 |
| 6,355,741 | B1 | | 3/2002 | Marechal .................. 526/64 |
| 2005/0037471 | A1 | * | 2/2005 | Liu et al. ................. 435/91.2 |

* cited by examiner

*Primary Examiner*—Fred M Teskin
(74) *Attorney, Agent, or Firm*—Tenley R. Krueger

(57) ABSTRACT

A polymer can be prepared using a loop reactor and process including feeding a process stream through the loop reactor and maintaining the loop reactor at a steady state by controlling a flow of coolant fluid to maintain a temperature in the loop reactor at a preset point. The temperature in the loop reactor may be maintained at a preset point by using a coolant fluid flow controller and valve unit having a substantially linear response over the normal operating range of the controller and valve unit. The normal operating range of the controller and valve unit may be sufficient to provide a flow range not limiting to the throughput of the loop reactor.

12 Claims, 3 Drawing Sheets

PROCESS FOR THE PRODUCTION OF POLYMERS USING A LOOP REACTOR

CROSS REFERENCE TO RELATED APPLICATIONS

This case claims priority from the U.S. Provisional Patent Application having Ser. No. 60/625,308 which was filed on Nov. 4, 2004.

BACKGROUND OF THE INVENTION

1. Field of the Invention

The present invention relates to a process for preparing polymers. The present invention particularly relates to a process for preparing polymers employing loop reactors.

2. Background of the Art

Chemicals in general and polymers in particular may be prepared in a reactor consisting of a pipe containing a flowing stream of reactants. One such pipe reactor is known as the slurry loop reactor. In a slurry loop reactor, reactants are feed into a pipe containing a solvent and a catalyst. The admixture of solvent, reactants, and catalyst are continuously recycled through the pipe, hence the term "loop," with the reaction product being continuously removed.

Despite loop reactors having been used for a long time, the process of starting and running a loop reactor is not without problems. For example, it has been taught in the art to use a microprocessor to automate starting up and running a loop reactor. One advantage of using a microprocessor may be that it may facilitate quickly achieving a steady state in the reactor, steady state being the condition under which the least amount of product variability occurs. Product variability may be generally considered a problem in the production of polymers.

SUMMARY OF THE INVENTION

In one aspect, the invention is a process for preparing polymers using a loop reactor. The process includes feeding a process stream through the loop reactor and maintaining the loop reactor at a steady state by controlling a flow of coolant fluid to maintain a temperature in the loop reactor at a preset point. The coolant fluid may be controlled using a coolant fluid flow controller and valve unit having a substantially linear response over the normal operating range of the controller and valve unit and the normal operating range of the controller and valve unit being sufficient to provide a flow range not limiting to the throughput of the loop reactor.

In another aspect, the invention is a polymer prepared using a process including feeding a process stream through the loop reactor and maintaining the loop reactor at a steady state by controlling a flow of coolant fluid to maintain a temperature in the loop reactor at a preset point. The coolant fluid may be controlled using a coolant fluid flow controller and valve unit having a substantially linear response over the normal operating range of the controller and valve unit and the normal operating range of the controller and valve unit being sufficient to provide a flow range not limiting to the throughput of the loop reactor.

In still another aspect, the invention is a process for preparing polymers using a loop reactor. The process includes feeding a process stream through the loop reactor and maintaining the loop reactor at a steady state by controlling a flow of coolant fluid to maintain a temperature in the loop reactor at a preset point. The coolant fluid may be controlled using a coolant fluid flow controller and valve unit having a substantially linear response over the normal operating range of the controller and valve unit.

In another aspect, the invention is a polymer prepared using a process including feeding a process stream through the loop reactor and maintaining the loop reactor at a steady state by controlling a flow of coolant fluid to maintain a temperature in the loop reactor at a preset point. The coolant fluid may be controlled using a coolant fluid flow controller and valve unit having a substantially linear response over the normal operating range of the controller and valve unit and the normal operating range of the controller.

BRIEF DESCRIPTION OF THE DRAWINGS

For a detailed understanding and better appreciation of the present invention, reference should be made to the following detailed description of the invention and the preferred embodiments, taken in conjunction with the accompanying drawings, wherein.

DETAILED DESCRIPTION OF INVENTION

Figure 1:
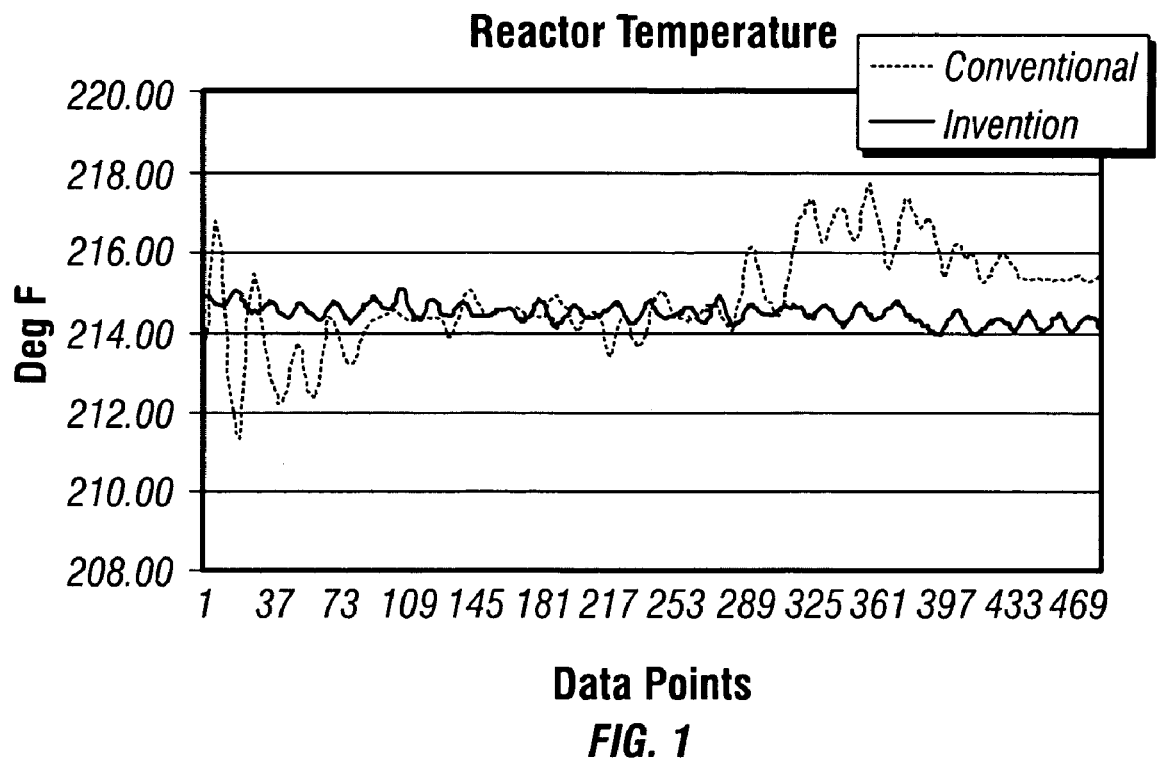
FIG. 1 is a plot of reactor temperatures during a plant run using a conventional process and during a plant run using the process of the invention.

In one embodiment, the invention is a process for preparing polymers using a loop reactor, the process including feeding a process stream through the loop reactor and maintaining the loop reactor at a steady state by controlling a flow of coolant fluid to maintain a temperature in the loop reactor at a preset point. The process may be used with any loop reactor process wherein the ability to maintain the reactor at a steady state may have an impact on product quality, manufacturing costs, or both. For example, the process of the present invention may be used with a high density polyethylene (HDPE) slurry process, but may also be used to manufacture other polymers, particularly polyolefins.

In another embodiment, the invention is a process for the preparation of high density polyethylene. In the manufacture of high density polyethylene, particles of polyethylene may be removed from the reactor by means of a settling leg. U.S. Pat. No. 3,293,000 to Marwil, which is incorporated herein by reference, discloses the use of settling legs in a loop reactor for manufacturing an ethylene butane copolymer. In this reference, the settling leg functions to allow a portion of the polymer slurry to escape from the loop into outlets that allow the particles to be gravimetrically removed.

While technology for preparing polymers has changed with respect to catalysts and reactants, the same general loop reactor technology employed in the 1960s is still in use. For example, U.S. Pat. No. 4,613,484 to Ayres, et al., which is incorporated herein by reference, discloses an improvement to settling legs, also referred to as accumulator legs, is disclosed. This technology may be still generally current and in present use, particularly for the production high density polyethylene. U.S. Pat. No. 6,355,741 to Marechal, which is incorporated herein by reference, discloses a process for producing polyolefins having a bimodal molecular weight distribution, the process comprising producing a first polyolefin fraction in the presence of a catalyst in a first loop reactor, and producing a second polyolefin fraction in the presence of the catalyst in a second loop reactor which may be serially connected to and downstream of the first loop reactor, and using settling legs for removing the polymer.

The process may be used with any loop reactor process wherein the ability to maintain the reactor at a steady state may have an impact on product quality, manufacturing costs, or both. For example, U.S. Pat. No. 6,303,825 to Gerlich, et al., which is incorporated herein by reference, discloses a method of starting up a loop reactor system using a microprocessor. One suggested algorithm recognizes the end of the startup of the reactor and then controls the reactor at steady state.

A steady state in a loop reactor may be achieved in the process by controlling a flow of coolant fluid to maintain a temperature in the loop reactor at a preset point. The fluid is typically water, but other heat exchanging fluids, such as air, may be used. Other coolant fluids include glycols, nitrogen, and the like.

One means of using coolant fluid is the use of cooling jackets. Cooling jackets may be simple or may contain baffles or other means of creating turbulence for improving the efficiency of heat removal. Cooling jackets may be continuous or in sections or dispensed with entirely in the case of cooling sprays. When a gas is used as the heat removal medium, it may be controlled in a similar manner to liquid cooling fluids as regards temperature and flow. In the case of air or other gas cooling, finned pipes are often employed.

In the process, a temperature in the loop reactor may be maintained at a preset point by using a coolant fluid flow controller and valve unit having a substantially linear response over the normal operating range of the controller. The meaning of having a linear response means that for every motion of the controller, a consistent amount of coolant fluid may be passed through the valve. For example, if the flow controller moves a valve to control coolant fluid flow, and the valve travels 10 cm from closed to fully open, then the quantity of coolant fluid passing through the valve increases by the approximate same amount per each cm traveled.

In contrast, the controller and valve unit used in a conventional plant may have to move a valve very different amounts depending on far open or closed the valve may be when a change of flow may be needed. For example, in a conventional process, when the valve is closed, then a comparatively large amount of travel may be required to allow a quantity of fluid to pass through the valve. As the valve approaches fully open, then less travel may be required to allow the same amount of fluid increase to occur. This complicates the program needed to control the valve.

In one embodiment of the invention, the normal operating range of the controller and valve unit is sufficient to provide a flow range not limiting to loop reactor throughput. A valve useful with the process may be linear over a range that will allow the cooling jacket and the piping associated with that cooling jacket to be fully utilized under the operating conditions of the loop reactor. Stated another way, for this embodiment, the controller and valve unit are sized such that the linear range of the valve is sufficient to allow the passage of the maximum amount of coolant fluid that the loop reactor's cooling jacket and associated piping, pumps, and the like can handle or require.

To achieve this, it may be necessary to oversize the valve of the controller and valve unit in that the total capacity of the valve may be substantially greater than the capacity of the other parts of the coolant system for the loop reactor. This may occur because the linear portion of the range of the valve may be 50 percent or even less than the total capacity of the valve. Most valves have a non-linear range both at the nearly fully open and nearly fully closed positions. In one embodiment of the process, the valve may be sized such that the process requirements at steady state require the valve to be in a position that is between both the lower and upper non-linear range of the valve.

The process may be used to prepare high density polyethylene in one embodiment. In another embodiment, the process of the invention may be used to prepare polypropylene. Copolymers of polyethylene and polypropylene may also be prepared. The process may be used with Ziegler-Natta and metallocene catalysts. The process may be used to prepare any polymer that may be prepared in a loop reactor requiring maintaining the loop reactor at a steady state.

The process of the invention may be used with a cooling jacket type coolant system as disclosed herein above. It may also be used with other types of coolant systems such as internal exchange coolant systems. Any coolant system that may be used to maintain a loop reactor at steady state may be used with the process.

In the process, a polymer may be prepared using a loop reactor by feeding a process stream through the loop reactor. The process stream will vary with the type of polymer being prepared. For example, the process stream may consist of one or more monomers, one or more catalysts and/or co-catalysts, in solution or suspension in a solvent.

The process of the invention may be practiced to narrow the variability of temperature at steady state conditions in a loop reactor. In the production of some polymers, this may result in a more controlled morphology of the polymer being produced. In one embodiment of the invention, the process may be used to reduce variability of molecular weight.

Other benefits of using the process may be reduced production costs. For example, the process may be used for a more efficient use of energy in maintaining steady state. The process may also allow for the more efficient use of raw materials reducing waste with its accompanying costs of disposal and/or recovery.

The term controller and valve unit may be used to describe the combination of a valve and a controller to open and close the valve as required to maintain a loop reactor at a steady temperature during polymerization. While the controller and valve unit may actually be a unit, that is both devices residing in a single housing or attached housings, embodiments where part or even all of the electronics are in two separate housings located some distance apart are also within the scope of the claims of the invention. In one embodiment, the electronics of the controller are located within a control room while the valve may be located about 200 feet away in a production unit.

EXAMPLES

The following examples are provided to illustrate the present invention. The examples are not intended to limit the scope of the present invention and they should not be so interpreted. Amounts are in weight parts or weight percentages unless otherwise indicated.

Example 1

A coolant system on a loop reactor is modified such that the valve of a controller and valve unit has a linear range that is sufficiently broad to cover the normal operating range of the loop reactor at steady state during the production of polyethylene. The valve can be modified by preparing a plug trim to fit within a control valve cage. The plug is drilled to provide a linear response over the operating range needed to meet the heat transfer requirements of the loop reactor during the polymerization of ethylene.

The loop reactor is started up and after the startup is over, data is recorded for reactor temperature, temperature set points, ethylene feed rates, ethylene in the flash gas, and the water jacket inlet temperature. The data collected is displayed in FIGS. 1-5.

Comparative Example 2

The process of Example 1 is repeated except that a conventional valve is used. The data collected is displayed in FIGS. 1-5.

BRIEF DISCUSSION OF THE EXAMPLES

Figure 2:
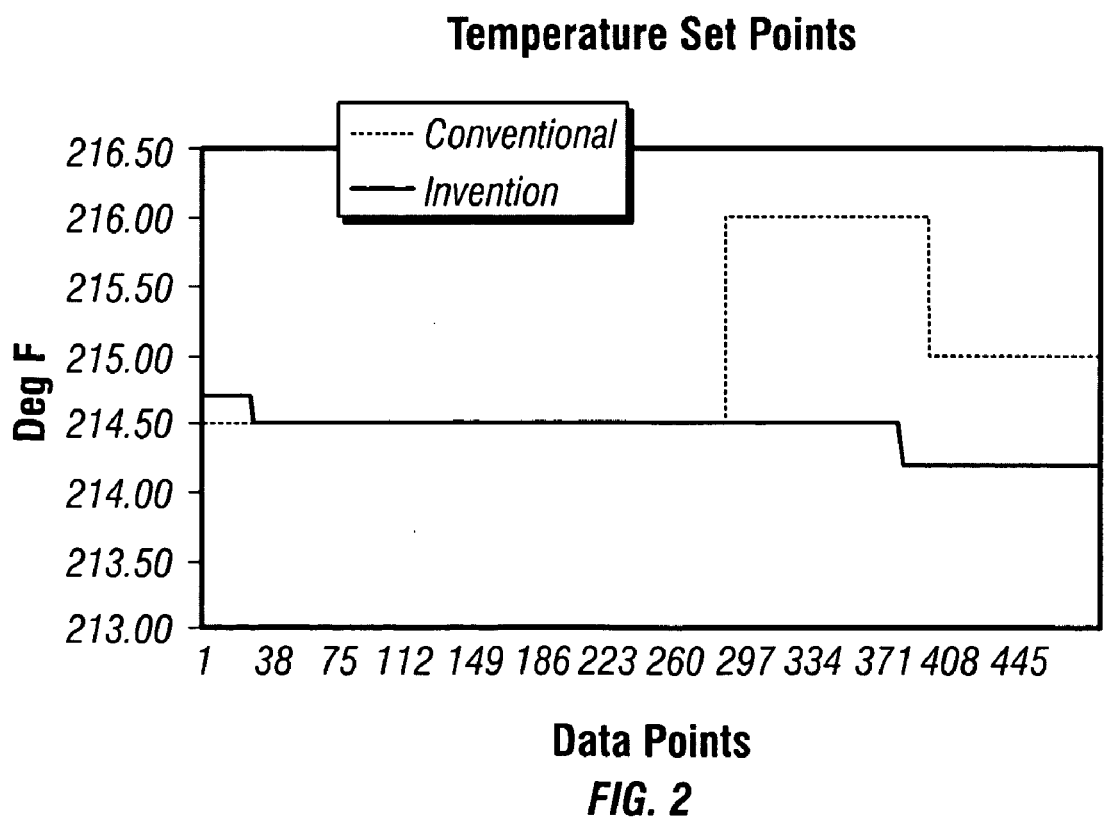
FIG. 2 is a plot of reactor temperature set points during a plant run using a conventional process and during a plant run using the process of the invention.
Figure 3:
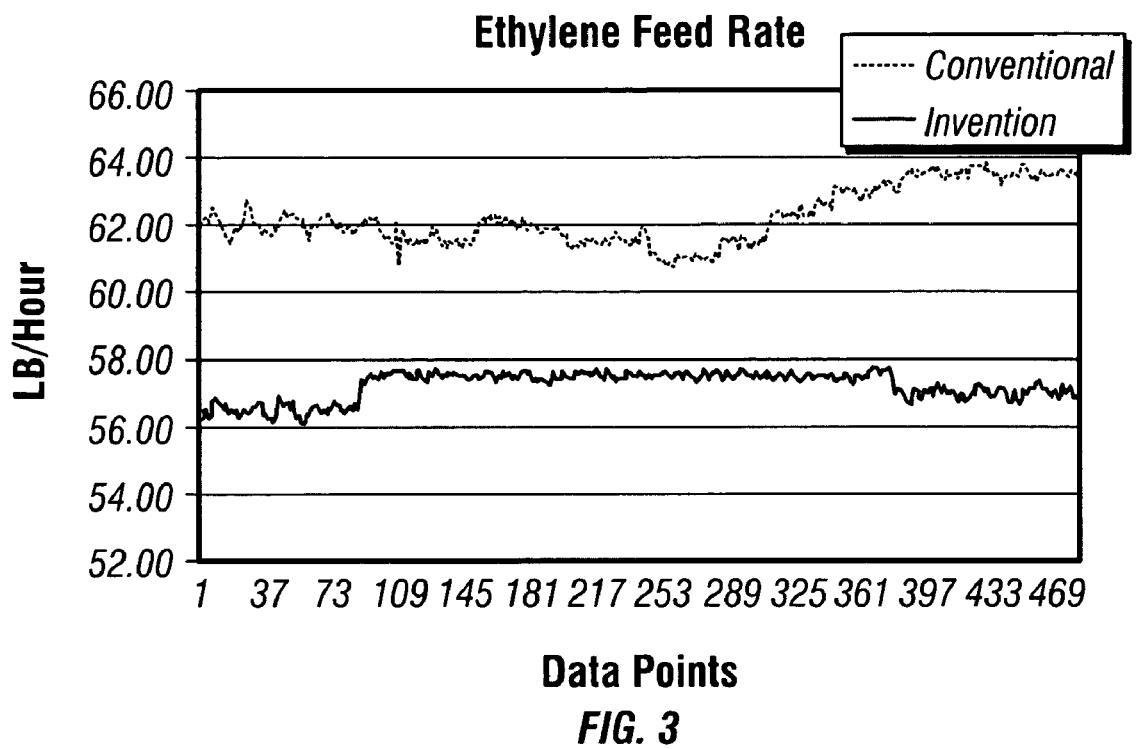
FIG. 3 is a plot of ethylene feed rates during a plant run using a conventional process and during a plant run using the process of the invention.
Figure 4:
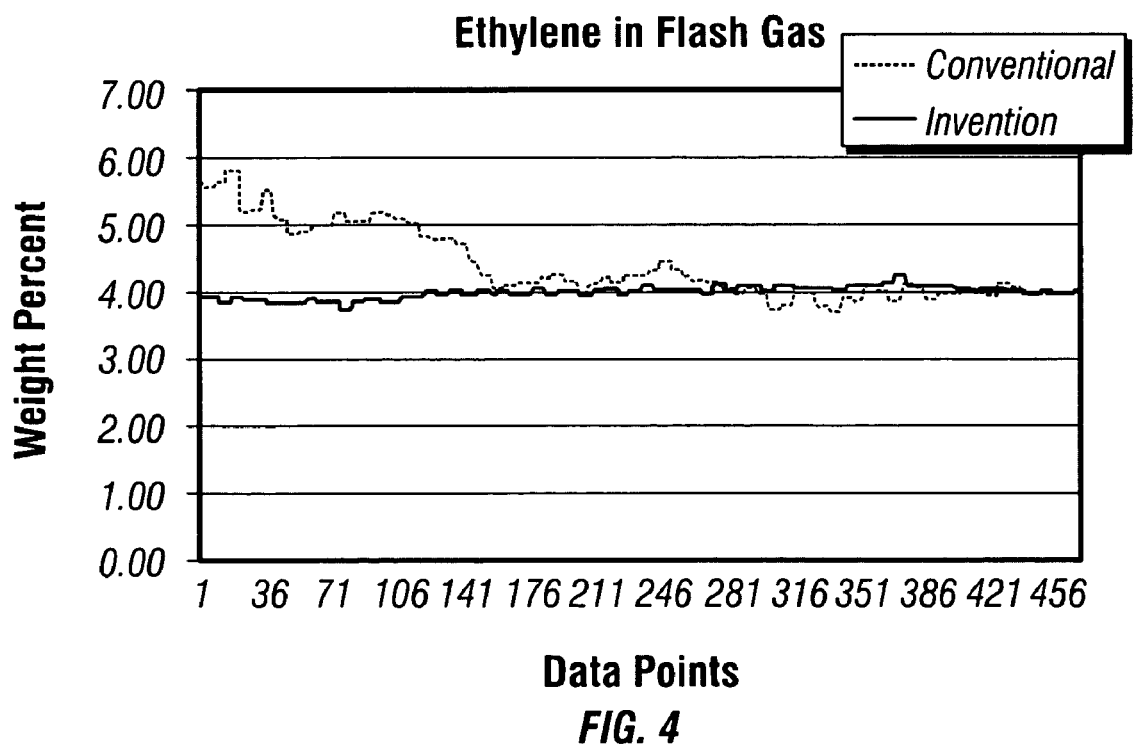
FIG. 4 is a plot of ethylene concentration in flash gas during a plant run using a conventional process and during a plant run using the process of the invention.
Figure 5:
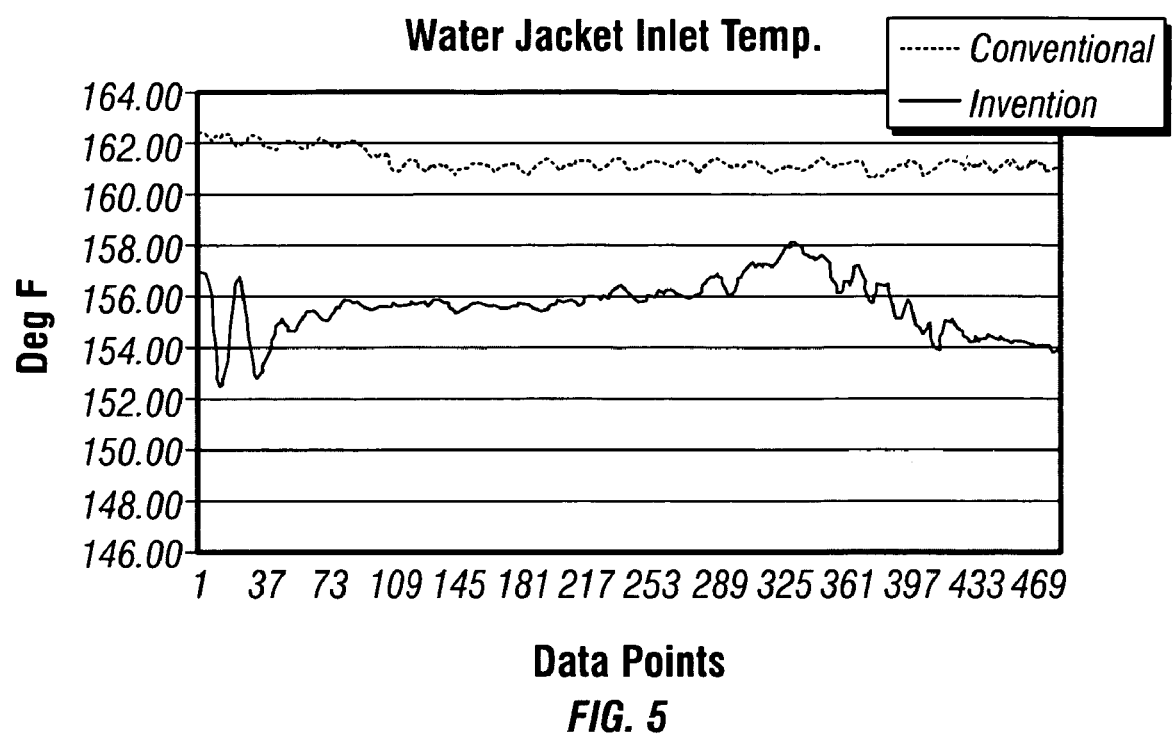
FIG. 5 is a plot of fluid jacket inlet temperatures during a plant run using a conventional process and during a plant run using the process of the invention.

Example 1 and comparative Example 2 illustrate the process advantages of the invention process in comparison to a conventional process. In FIG. 1 is may be seen that the variability of the reactor temperature during polymerization was substantially less when using the invention process than the conventional process. In FIG. 2, it may be observed that the operations personnel were required to make fewer set point changes using the invention process and when required to make changes, the change were of a smaller magnitude than those made during the conventional process. FIG. 3 illustrates that the invention process allows for less variability in ethylene feed and FIG. 4 illustrates a reduction of ethylene in the flash gas. FIG. 5 shows the water jacket inlet temperature also has less variability in the invention process than in the conventional process.

What is claimed is:

1. A process for preparing polymers using a loop reactor comprising feeding a process stream through the loop reactor and maintaining the loop reactor at a steady state by controlling a flow of coolant fluid to maintain a temperature in the loop reactor at a preset point by using a coolant fluid flow controller and valve unit having a substantially linear response over the normal operating range of the controller and valve unit and the normal operating range of the controller and valve unit being sufficient to provide a flow range not limiting to loop reactor throughput.

2. The process of claim 1 wherein the controller and valve unit comprises a controller and a valve and the controller and valve are contained within a single housing.

3. The process of claim 1 wherein the controller and valve unit comprises a controller and a valve and the controller and valve are in housings connected together.

4. The process of claim 1 wherein the controller and valve unit comprises a controller and a valve and the controller and valve are in housings remote from each other.

5. The process of claim 1 wherein the process stream includes a Ziegler-Natta catalyst.

6. The process of claim 1 wherein the process stream includes a metallocene catalyst.

7. A process for preparing polymers using a loop reactor comprising feeding a process stream through the loop reactor and maintaining the loop reactor at a steady state by controlling a flow of coolant fluid to maintain a temperature in the loop reactor at a preset point by using a coolant fluid flow controller and valve unit having a substantially linear response over the normal operating range of the controller and valve unit.

8. The process of claim 7 wherein the controller and valve unit comprises a controller and a valve and the controller and valve are contained within a single housing.

9. The process of claim 7 wherein the controller and valve unit comprises a controller and a valve and the controller and valve are in housings connected together.

10. The process of claim 7 wherein the controller and valve unit comprises a controller and a valve and the controller and valve are in housings remote from each other.

11. The process of claim 7 wherein the process stream includes a Ziegler-Natta catalyst.

12. The process of claim 7 wherein the process stream includes a metallocene catalyst.

* * * * *